United States Patent
Parlos et al.

(10) Patent No.: US 6,963,862 B1
(45) Date of Patent: Nov. 8, 2005

(54) METHOD AND SYSTEM FOR TRAINING A RECURRENT NETWORK

(75) Inventors: Alexander G. Parlos, College Station, TX (US); Amir F. Atiya, Pasadena, CA (US)

(73) Assignee: The Texas A&M University System, College Station, TX (US)

( * ) Notice: Subject to any disclaimer, the term of this patent is extended or adjusted under 35 U.S.C. 154(b) by 556 days.

(21) Appl. No.: 09/823,599

(22) Filed: Mar. 30, 2001

Related U.S. Application Data

(60) Provisional application No. 60/193,678, filed on Mar. 31, 2000.

(51) Int. Cl.[7] .............................. G06E 1/00; G06E 3/00; G06F 15/18; G06G 7/00; G06N 3/06; G06N 3/063; G06N 3/067

(52) U.S. Cl. .............................. 706/30; 706/15; 706/26

(58) Field of Search .............................. 706/15, 30, 26

(56) References Cited

PUBLICATIONS

Kishan Mehrotra, Artificial Neural Networks, 1997, MIT, p 138.*

* cited by examiner

*Primary Examiner*—Anil Khatri
*Assistant Examiner*—Joseph P. Hirl
(74) *Attorney, Agent, or Firm*—Joseph P. Lally; Michael A. Davis, Jr.

(57) ABSTRACT

A method for training a recurrent network represented by $x(k+1)=f(W\ x(k))$, where W is a weight matrix, x is the output of the network, and K is a time index includes (a) determining the weight matrix at a first time increment, (b) incrementing the time increment associated with a received data point, and (c) determining a change in the weight matrix at the incremented time interval according to the formula:

$$\Delta W(K) = \Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}$$

40 Claims, 2 Drawing Sheets

METHOD AND SYSTEM FOR TRAINING A RECURRENT NETWORK

RELATED APPLICATION

This application claims the benefit under 35 U.S.C. § 119(e) of the filing date of U.S. Provisional Application Serial No. 60,193,678, entitled "System and Method for Real-time Recurrent Learning of Complex Spatio-Temporal Patterns," filed Mar. 31, 2000.

TECHNICAL FIELD OF THE INVENTION

This invention relates generally to recurrent networks and more particularly to a method and system for training a recurrent network.

BACKGROUND OF THE INVENTION

Recurrent networks are basically dynamic system simulators where the states evolve according to certain nonlinear state equations. Because of their dynamic nature, they have been successfully applied to many problems involving modeling and processing of temporal signals, such as adaptive control, forecasting, system identification, and speech recognition. Recurrent networks are used to simulate dynamic systems and are often implemented in computer software.

Recurrent networks generate outputs based on a plurality of inputs according to the formula:

$$x(k+1)=f[Wx(k)].$$

In the above equation, x is a vector representing one or more outputs of the recurrent network. For simplicity of description x is used herein without subscripts. k is a time index associated with the output x. For example, x(2) refers to the value of the vector x that is determined from previous values of x (x(0) and x(1)). As a physical example, x may represent the most likely next purchase of a consumer. In such a case x(2) represents the most likely next purchase of a consumer based on the predicted values for the customer's first (x(0)) and second (x(1)) purchase. In the above equation, $f$ represents a function that is chosen to represent the dynamic system that is simulated, and W is a weight matrix that is "trained" to better predict values for x. As described in greater detail below, the inputs to the recurrent network are previous values of x. For example, in the above description x(0) and x(1) are used as inputs to predict x(2).

Despite the potential and capability of recurrent networks, the main problem recurrent networks present is proper training of the weight matrix. Many existing algorithms are complex and slow to converge. The training problem consists of adjusting the weights of the network such that the trajectories of its dynamic states have certain specified properties. Because a weight adjustment affects the values of x at all times during the course of network state evolution, obtaining the error gradient, or gradient with respect to the weights, W, of the difference between the predicted values, x, and actual measured values, represented herein as d, is a rather complicated procedure.

Some previous attempts at training recurrent networks have focused on computational methods for obtaining the gradient. These approaches require an excessive number of iterations to generate the desired weights.

SUMMARY OF THE INVENTION

Accordingly, a need has arisen for an improved method and system for training a recurrent network. The present invention provides a method and system for training a recurrent network that addresses shortcomings of prior systems and methods.

According to one embodiment of the invention, a method for training a recurrent network represented by x(k+1)=f(W x(k)) is provided. W is a weight matrix, x is an input vector; and f is a function. The method includes (a) determining values for an internal variable vector, (b) determining values for an internal variable matrix, and (c) based on the internal variable vector and the internal variable matrix, determining a change in the weight matrix. The method also includes repeating steps (a), (b), and (c) until the change in the weight matrix reaches an acceptable limit. The internal variable vector is defined as:

$$\gamma(1)=-D^{-1}(0)e^{T}(1); \text{ and}$$

$$\gamma(k)=-D^{-1}(k-1)e^{T}(k)+We^{T}(k-1) \text{ for } k=2,\ldots,K;$$

The internal variable matrix is defined as:

$$V(K)=\epsilon I+\Sigma_{k=0}^{K-1}x(k)x^{T}(k);$$

The change in the weight matrix is defined as:

$$\Delta W = \eta \left[ \sum_{k=1}^{K} \gamma(k)x^{T}(k-1) \right] V^{-1}(K); \text{ and}$$

In these equations:

$$D(k) = \text{diag}\left( f'\left( \sum_{j=1}^{N} w_{ij}x_{j}(k) \right) \right),$$

$$e_i(k) = \begin{cases} x_i(k) - d_i(k), & i \in 0 \\ 0, & \text{otherwise,} \end{cases}$$

$$\varepsilon = \max(0.5 - \lambda_1, 0).$$

In addition,

I is the identity matrix;

η is a parameter that has a value less than 1.0;

$\lambda_1$ is the smallest eigenvalue of V(K);

f'=the time derivative of f;

$d_i(k)$=measured values of data associated with $x_i$;

i is an index identifying an element of a vector; and j is an index identifying an element of a vector or a matrix.

According to another embodiment of the invention, a method for training a recurrent network represented by x(k+1)=f(W x(k)) is provided. W is a weight matrix; x is the output of the network; and K is a time index. The method includes (a) determining the weight matrix at a first time increment, (b) incrementing the time increment associated with a received data point, and (c) determining a change in the weight matrix at the incremented time interval according to the formula:

$$\Delta W(K) = \Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}$$

In this equation, $\eta$ is a parameter that has a value less than 1.0;

$\gamma(1) = -D^{-1}(0)e^T(1)$;

$\gamma(K) = -D^{-1}(K-1)e^T(K) + We^T(K-1)$;

$B(K) = B(K-1) + \gamma(K)x^T(K-1)$;

$V^{-1}/\epsilon - x(0)x^T(0)/[\epsilon^2 + \epsilon x^T(0)x(0)]$;

$$V^{-1}(K) = V^{-1}(K-1) - \frac{[V^{-1}(K-1)x(K-1)][V^{-1}(K-1)x(K-1)]^T}{1 + x^T(K-1)V^{-1}(K-1)x(K-1)};$$

$$(B)1 = \gamma(1)x^T(0);$$

$$D(k) = diag\left(f'\left(\sum_{j=1}^{N} w_{ij}x_j(k)\right)\right);$$

$$e_i(k) = \begin{cases} x_i(k) - d_i(k), & i \in 0 \\ 0, & \text{otherwise,} \end{cases}; \text{ and}$$

In addition, $\epsilon = \max(0.5 - \lambda_1, 0)$;

$\lambda_1$ is the smallest eigenvalue of $V(K)$;

$f'$ = the time derivative of $f$;

$d_i(K)$ = measured values of data associated with $x_i$;

i is an index identifying an element of a vector; and j is an index identifying an element of a vector or a matrix.

Embodiments of the invention provide numerous technical advantages. For example, in one embodiment of the invention, a recurrent network training process is provided that converges to a weight matrix about 25% faster than traditional techniques for systems with a small number of outputs and converges faster than traditional techniques in most other cases.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 5 of the drawings, like numerals being used for like and corresponding parts of the various drawings.

Figure 1:
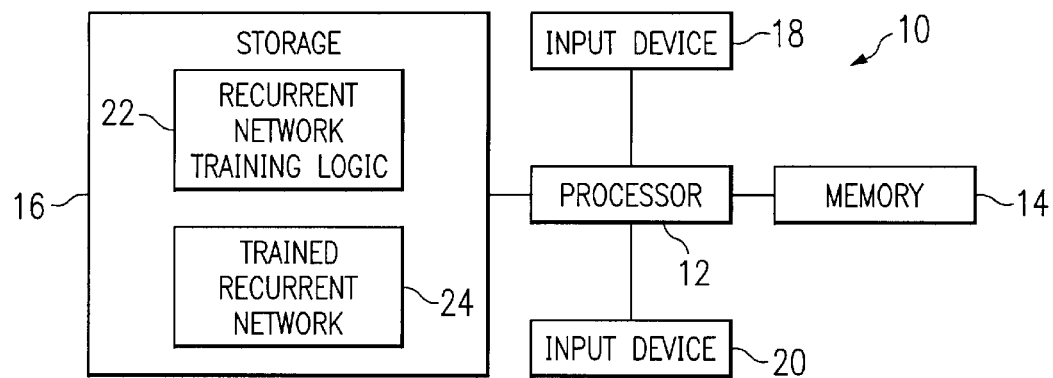
FIG. 1 is a block diagram of a system for training a recurrent network according to the teachings of the invention and of a trained recurrent network according to the teachings of the invention.

FIG. 1 is a block diagram of a system 10 for training a recurrent network and of a trained recurrent network according to the teachings of the invention. System 10 includes a processor 12 having an associated memory 14 and associated storage 16. Processor 12, memory 14, and storage 16 may be accessed through input device 18 and may provide output through output device 20. Recurrent network training logic 22 and a trained recurrent network 24 are stored in storage 16.

Trained recurrent network 24 may be used for a plurality of types of different models, including a predictive model, a filtering model, or a classification or grouping model. A predictive model refers to a model used to predict future behavior based on past behavior, such as the likely next purchase of a customer. A classification or grouping model is used for profiling purposes, such as identifying persons who buy expensive products. A filtering model may be used to access quantities that cannot be measured, such as estimating where a person has been on the Internet.

According to the teachings of the invention, recurrent network training logic 22 trains a recurrent network to produce trained recurrent network 24. This training involves determination of appropriate weights in a weight matrix, as defined below. The teachings of the invention recognize that the weights may be determined in a more efficient manner if an error gradient is approximated rather than determined exactly and provide computational approaches for doing so. Recurrent network training logic 22 includes appropriate logic to effect such an approach.

Processor 12 is any processor suitable for executing logic stored in any computer-readable medium. Example processors suitable for use with the present invention include processors available from Intel, AMD, Motorola, and other types of processors, including those manufactured for mainframes and minicomputers. Memory 14 refers to random access memory; however, any suitable type of memory may be used. Memory 14 may be used to temporarily store data and processes associated with recurrent network training logic 22 and trained recurrent network 24; however, such processes may reside solely in storage 16 if desired.

Storage 16 may be a mass-storage media, or alternatively, removable storage media, such as floppy disks, CD ROMs, or other removable media. Recurrent network training logic 22 and trained recurrent network 24 are illustrated as being stored in storage 16 in the manner computer programs are often stored in mass storage; however, recurrent network training logic 22 and trained recurrent network 24 may be stored permanently in memory 14 if desired, or in other locations. Input device 18 may be any suitable input device such as a keyboard, mouse, or other device for providing input to system 10. Output device 20 may be any suitable output device, such as a monitor, printer, or other device for providing output from system 10.

Recurrent network training logic 22, as described above, includes appropriate logic for training a recurrent network and generating a trained recurrent network 24. In this embodiment, recurrent network training logic 22 and trained recurrent network 24 are illustrated as both being stored in storage 16; however, trained recurrent network 24 may reside in memory other than storage 16, or on a system other than system 10. Both are shown here for convenience as residing on the same computer. Details of recurrent training logic 22 are described in greater detail below in conjunction with FIGS. 2 through 5.

Figure 2:
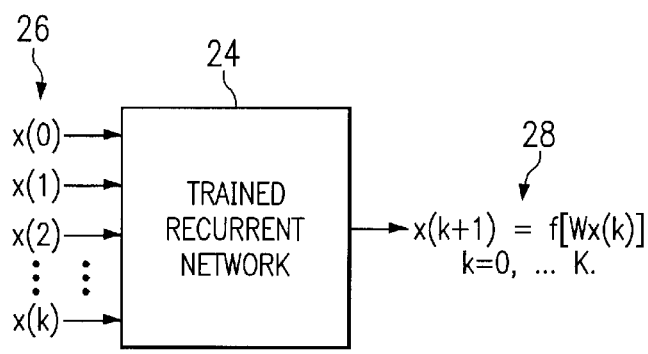
FIG. 2 is a block diagram of the trained recurrent network of FIG. 1 showing its inputs and outputs.

FIG. 2 is a block diagram of trained recurrent network 24 of FIG. 1 showing inputs 26 to the network 24 and outputs 28 from the network 24. As illustrated, trained recurrent network 24 receives a plurality of inputs 26. Inputs 26 are represented by a vector x having a time index of k, where $x(k)=(x_1(k), \ldots, x_N(k))^T$ at time k. Trained recurrent network 24 generates an output x(k+1) 28 that is equal to a function of the product of the inputs 26 and a weight matrix. f denotes a node function (e.g. sigmoid, tanh, etc.), or function used to model the physical system modeled by trained recurrent network 24. As used herein, f applied to a vector $y=(Y_1, \ldots, y_N)^T$, is defined as $f(y)=(f(y_1), \ldots, f(y_N))^T$. As illustrated, output 28 is related to inputs 26 according to the following equation:

$$x(k+1)=f[Wx(k)], k=0, \ldots, K-1, \quad (1)$$

where k denotes the time index. Note that x(0) represents the vector of initial conditions for the network. Recurrent network training logic 22 determines the values for the weight matrix. This determination is referred to as training of a recurrent network.

Figure 3:
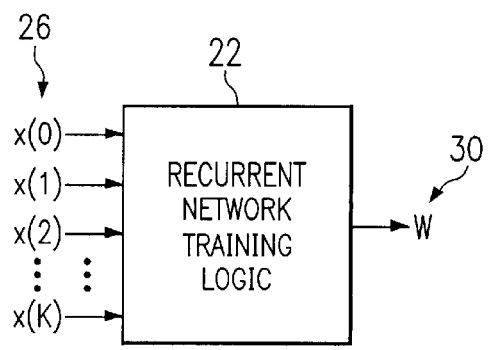
FIG. 3 is a block diagram of the recurrent network training logic of FIG. 1 showing its inputs and outputs.

FIG. 3 is a block diagram of recurrent network training logic 22 showing its inputs 26 and outputs 30. Recurrent network training logic 22 receives as inputs 26 vector x, the same input variables as input 26 in FIG. 2. Recurrent network training logic generates as an output 30 the weight matrix W used in Equation (1) to determine a predicted next value for vector x. According to the teachings of the invention, training the network is accomplished by updating the weights in the negative direction of the error gradient, i.e., $$W(\text{new}) = W(\text{old}) - \eta \frac{dE}{dW} \quad (2)$$

where η is the learning rate, and E represents the sum of square error:

$$E = \frac{1}{2}\sum_{k=1}^{K} \sum_{i \in O} (x_i(k) - d_i(k))^2, \quad (3)$$

where $d_i(k)$ is the desired output, or measured or known values, for unit i at time step k, and O is the set of output nodes. Here, unit i refers to the particular one variable of the vector x of concern, and the output nodes refer to the predicted value for x.

The training problem can be formulated in the form of the following constraint minimization problem: Minimize E, given by Equation (3), subject to $$g(k+1) \equiv f[Wx(k)] - x(k+1) = 0, k=0, \ldots, K-1. \quad (4)$$

According to the invention, the weights 30 are considered the "control" or "decision variables". The x(k)'s 26 are the "state variables," whose values are determined by the control parameters through the constraint Equation (4).

Minimization of the error, as represented by Equation (3), may be performed as follows: Let $g=(g^T(1), \ldots, g^T(K))^T$ and arrange the rows $w_i^T$ of W in one long column vector w, i.e. $w=(w_1^T, \ldots, w_N^T)^T$. Similarly, let $x=(x^T(1), \ldots, x^T(K))^T$. To clarify the variable dependencies in the following derivation, x is written as x(w), E as E(x(w)), and g as g(w,x(w)). Thus $$\frac{dE(x(w))}{dw} = \frac{\partial E(x(w))}{\partial w} + \frac{\partial E(x(w))}{\partial x}\frac{\partial x(w)}{\partial w}, \quad (5)$$

where ∂E(x(w))/∂w equals zero, because there is no explicit dependence on w. Taking the derivative of the equation g(w,x(w))=0 yields $$\frac{\partial g(w, x(w))}{\partial w} + \frac{\partial g(w, x(w))}{\partial x}\frac{\partial x(w)}{\partial w} = 0. \quad (6)$$

Solving Equations (5) and (6) yields:

$$\frac{dE(x(w))}{dw} = -\frac{\partial E(x(w))}{\partial w}\left(\frac{\partial g(w, x(w))}{\partial x}\right)^{-1}\frac{\partial g(w, x(w))}{\partial w}. \quad (7)$$

For simplicity, the notations expressing variable dependencies in Equation (7) are not explicitly shown hereinafter, resulting in $$\frac{dE}{dw} = -\frac{\partial E}{\partial x}\left(\frac{\partial g}{\partial x}\right)^{-1}\frac{\partial g}{\partial w}. \quad (8)$$

The convention used here is that ∂u/∂v for two vectors u and v is the matrix whose (i,j)th element is $\partial u_i/\partial v_j$.

The matrices in Equation (8) can be evaluated as follows:

$$\frac{dE}{dx} = (e(1), \ldots, e(K)) \equiv e, \quad (9)$$

$$\frac{\partial g}{\partial x} = \begin{pmatrix} -I & 0 & 0 & \ldots & 0 & 0 \\ D(1)W & -I & 0 & \ldots & 0 & 0 \\ 0 & D(2)W & -I & \ldots & 0 & 0 \\ \vdots & \vdots & \vdots & \ddots & \vdots & \vdots \\ 0 & 0 & 0 & \ldots & D(K-1)W & -I \end{pmatrix}, \quad (10)$$

$$\frac{\partial g}{\partial x} = \begin{pmatrix} D(0)X(0) \\ D(1)X(1) \\ \vdots \\ D(K-1)X(K-1) \end{pmatrix}, \quad (11)$$

where e(k) is a row vector, whose elements are given by $$e_i(k) = \begin{cases} x_i(k) - d_i(k), & i \in O \\ 0, & \text{otherwise,} \end{cases} \quad (12)$$

$$D(k) = \text{diag}\left(f'\left(\sum_{j=1}^{N} w_{ij}x_j(k)\right)\right), \quad (13)$$

-continued $$X(k) = \begin{pmatrix} x^T(k) & 0 & 0 & \cdots & 0 \\ 0 & x^T(k) & 0 & \cdots & 0 \\ \vdots & \vdots & \vdots & \ddots & \vdots \\ 0 & 0 & 0 & \cdots & x^T(k) \end{pmatrix} \qquad (14)$$

where I is the identity matrix, and 0 in (10) and (14) is a matrix (or vector) of zeros. Below, the error gradient is used in a matrix form, rather than row vector form. This is denoted as $\partial E/\partial W$ (note the upper case W), and this means the matrix with components $\partial E/\partial w_{ij}$.

According to the teachings of the invention, rather than insisting on computing the exact gradient for the recurrent network training problem, as defined in Equation (8), and paying the price in high computational complexity, the approach used here is to obtain an approximation for the gradient that can be efficiently computed. This results in faster convergence to the minimum error, as defined by Equation (3), than an approach in which the gradient is exactly determined.

The approach utilized by recurrent network training logic 22 involves interchanging the roles of the network inputs 26, x(k), and the weight matrix W (reference numeral 30). The inputs 26 are considered as the control variables, and the change in the weights is determined according to the changes in x(k). In other words, the gradient of E is calculated with respect to inputs 26, x(k), and a small change is assumed in the states x(k) in the negative direction of that gradient ($\Delta x_t(k)=-\eta[(\partial E/\partial x_t(k))]$). Next, the change in the weights that will result in changes in x(k) as close as possible to the targeted changes $\Delta x(k)$ is determined. The details of the algorithm are as follows:

Take $$\Delta x = -\eta \left(\frac{\partial E}{\partial x}\right)^T. \qquad (15)$$

Note that the transpose in Equation (15) is because $\partial E/\partial x$ is by definition a row vector. From (9), $$\Delta x = \eta e^T = -\eta(e(1), \ldots, e(K))^T. \qquad (16)$$

To simplify the final results, the constraints in Equation (4) can be rewritten as $$g'(k+1) \equiv Wx(k) - f^{-1}(x(k+1)) = 0, k=0, \ldots, K-1, \qquad (17)$$

and let $g'=(g'^T(1), \ldots, g'^T(K))^T$. The derivatives of g with respect to w and x are modified as follows $$\frac{\partial g'}{\partial x} = \begin{pmatrix} -D^{-1}(0) & 0 & 0 & \cdots & 0 & 0 \\ W & -D^{-1}(1) & 0 & \cdots & 0 & 0 \\ 0 & W & -D^{-1}(2) & \cdots & 0 & 0 \\ \vdots & \vdots & \vdots & \ddots & \vdots & \vdots \\ 0 & 0 & 0 & \cdots & W & -D^{-1}(K-1) \end{pmatrix} \qquad (18)$$

$$\frac{\partial g'}{\partial w} = \begin{pmatrix} X(0) \\ X(1) \\ \vdots \\ X(K-1) \end{pmatrix} \qquad (19)$$

Since g', given by Equation (17), equals zero, then $$\frac{\partial g'}{\partial w}\Delta w + \frac{\partial g'}{\partial w}\Delta x = 0. \qquad (20)$$

It is desired to find the direction of weight change $\Delta w$ that will result in Equation (20) being approximately satisfied, i.e. such that $$\frac{\partial g'}{\partial w}\Delta w \approx -\frac{\partial g'}{\partial x}\Delta x. \qquad (21)$$

Since the number of weights is typically less than the dimension of x, or the number of data points for x, an exact solution is usually not possible. Therefore, a minimum sum of square error solution is utilized. That leads to the following solution involving the pseudoinverse of $\partial g/\partial w$:

$$\Delta w = -\left[\left(\frac{\partial g'}{\partial w}\right)^T\left(\frac{\partial g'}{\partial w}\right)\right]^{-1}\left(\frac{\partial g'}{\partial w}\right)^T\frac{\partial g'}{\partial x}\Delta x. \qquad (22)$$

This Equation (22) may be solved using an internal variable $\gamma$. Let $$\gamma = \frac{\partial g'}{\partial x}e^T = \frac{-1}{\eta}\frac{\partial g'}{\partial x}\Delta x, \qquad (23)$$

and partition the vector $\gamma$ into the K vectors:

$$\gamma = \begin{pmatrix} \gamma(1) \\ \gamma(2) \\ \vdots \\ \gamma(K) \end{pmatrix} \qquad (24)$$

where $\gamma(k)$ is the Nx1 vector associated with time step k. Using Equations (18) and (23), $\gamma(k)$ may be evaluated as follows.

$$\gamma(1) = -D^{-1}(0)e^T(1), \qquad (25a)$$

$$\gamma(2) = -D^{-1}(1)e^T(2) + We^T(1), \qquad (25b)$$

$$\vdots$$

$$\gamma(K) = -D^{-1}(K-1)e^T(K) + We^T(K-1). \qquad (25c)$$

The matrix inverse $[(\partial g'/\partial w)]^T([(\partial g'/\partial w)])^{-1}$, the first portion of the right-hand side of Equation (57), can be evaluated using the definitions of $[(\partial g'/\partial w)]$ and X(k) (Equations (19) and (14)) to obtain:

$$\left[\left(\frac{\partial g}{\partial w}\right)^T\left(\frac{\partial g}{\partial w}\right)\right]^{-1} = \begin{pmatrix} \sum_{k=0}^{K-1} x(k)x^T(k) & 0 & \cdots & 0 \\ 0 & \sum_{k=0}^{K-1} x(k)x^T(k) & \cdots & 0 \\ \vdots & \vdots & \ddots & \vdots \\ 0 & 0 & \cdots & \sum_{k=0}^{K-1} x(k)x^T(k) \end{pmatrix}^{-1} \quad (26)$$

$$= \begin{pmatrix} \left[\sum_{k=0}^{K-1} x(k)x^T(k)\right]^{-1} & 0 & \cdots & 0 \\ 0 & \left[\sum_{k=0}^{K-1} x(k)x^T(k)\right]^{-1} & \cdots & 0 \\ \vdots & \vdots & \ddots & \vdots \\ 0 & 0 & \cdots & \left[\sum_{k=0}^{K-1} x(k)x^T(k)\right]^{-1} \end{pmatrix}.$$

To simplify, another internal variable is defined as:

$$V'(K) = \sum_{k=0}^{K-1} x(k)x^T(k) \quad (27)$$

Rather than representing the weights in the form of one long vector w, they are represented here in the more convenient form of matrix W. Substituting Equations (26), (27), (23), and (19) into (22), and after some manipulation the following formula for the change in the weight matrix is obtained:

$$\Delta W = \eta \left[\sum_{k=1}^{K} \gamma(k)x^T(k-1)\right] V'^{-1}(K). \quad (28)$$

The problem with Equation (28) is that there is a matrix inversion, causing ill-conditioning problems. According to the teachings of the invention, this problem may be alleviated by adding to the outer product matrix V'(K) a small matrix $\epsilon I$, where $\epsilon$ is a small positive constant, to obtain $$V(K) = \varepsilon I + \sum_{k=0}^{K-1} x(k)x^T(k). \quad (29)$$

$$\Delta W = \eta \left[\sum_{k=1}^{K} \gamma(k)x^T(k-1)\right] V^{-1}(K). \quad (30)$$

This addition makes the new matrix strictly positive definite. The appropriate value for $\epsilon$ may be determined as follows:
One can write the following relation $$V^{-1}(k) = \text{Adj}(V'(k))/\det(V'(k))$$

where Adj is the adjoint matrix and det denotes the determinant. Since the determinant appears in the denominator, it is the term responsible for the ill-conditioning of the matrix V(k). $\epsilon$ is determined such that the determinant term is not less than a certain small value.

The following expression is used as a starting point for the algorithm allowing proper selection of $\epsilon$:

$$\det(V'(k)) = \Pi_i \lambda_i$$

where $\lambda_i$ is the $i^{th}$ eigenvalue of V(k) (in ascending order, that is $\lambda_1$ is the smallest eigenvalue). Then, $$\det(V(k)) = \det(\epsilon I + V'(k)) = \Pi_i(\epsilon + \lambda_i).$$

$\epsilon$ is selected such that the smallest term in the right hand side of the previous equation is at least some given small value, say 0.05. Therefore E is chosen such that $$\epsilon + \lambda_1 \geq 0.05$$

$$\epsilon = \max(0.05 - \lambda_1, 0).$$

Thus, a change in the weight matrix may be determined according to Equation (30), utilizing the appropriate selection of in Equation (29). If the change in weight matrix is too large, this means that the weight matrix is not accurate enough. Because the value of the weight matrix affects predicted values x(k) and then in turn affect the change in the weight matrix, an iterative procedure is invoked until the change in the weight matrix reaches suitably low levels. A process for generating weight matrix W according to the above derivation is described below in conjunction with FIG. 4.

Figure 4:
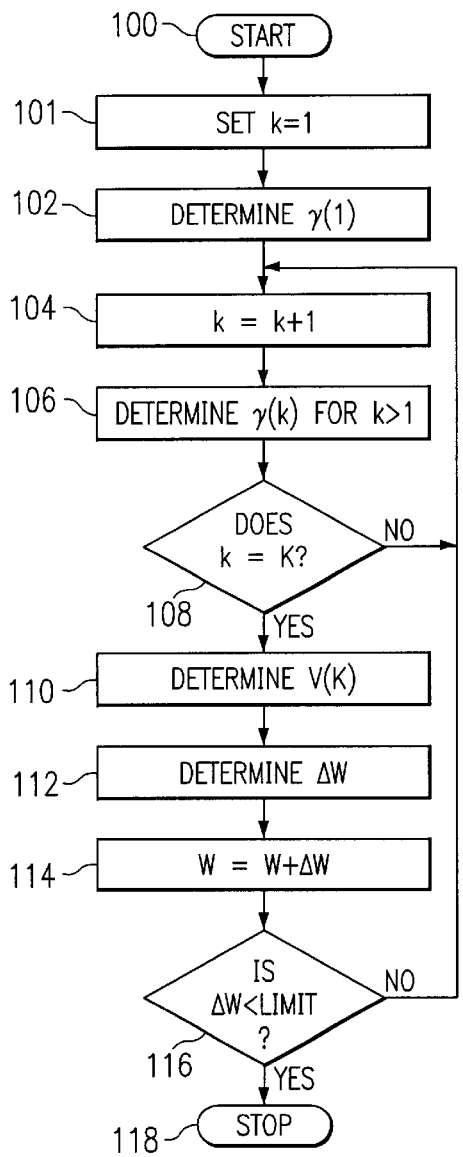
FIG. 4 is a flowchart showing example steps associated with one embodiment of the recurrent network training logic of FIG. 3 according to the teachings of the invention.

FIG. 4 is a flowchart showing one embodiment of a method for generating weights by recurrent network training logic 22 according to the teachings of the invention. These steps, or analogous steps, may be programmed in any suitable language to produce a recurrent network training program. Alternatively, such steps may be encoded in an application specific integrated circuit (ASIC) or take other suitable physical forms.

The method begins at step 100. At a step 101, the time index k is set to one. At a step 102, an internal variable γ(1) is determined according to Equation (25a). At a step 104, the time index k is incremented by one. At step 106, γ(k) is calculated according to Equation (25c). At a step 108, a determination is made of whether the time index k is equal to K, corresponding to all data points being exhausted. If all data points have not been exhausted, processing continues, and steps 104 and 106 are repeated until all data points are exhausted.-

At step 110, an internal matrix V(K) is determined according to Equation (29). As illustrated in Equation (29) determination of V(K) utilizes previously determined values for x (up to x(k−1)) and , which is determined as described above. At step 112, a change in the weight matrix is determined according to Equation (30) based on the results of step 110 and steps 104 through 108. At step 114, the weight matrix W is updated to reflect the change calculated at step 112. At step 116, a decision is made regarding whether the change in the weight matrix is less than an acceptable limit, meaning that if the weight matrix has not changed too much since the last iteration, the weight matrix is sufficiently accurate.

If the change in the weight matrix calculated at step 114 is not below an acceptable limit, processing continues at step 104. Because determination at step 106 of $\gamma(k)$ is dependent upon the value of the weight matrix, W, the resulting values for $\gamma(k)$ during this iteration will be updated. If at step 116, the change in the weight matrix was small enough, processing is completed at step 118.

The relevant formulas are summarized below, as follows:

1) $\gamma(1) = -D^{-1}(0)e^T(1)$,

1) $\gamma(k) = -D^{-1}(k-1)e^T(k) + We^T(k-1)$. $k = 2, \ldots, K$.

2) $V(K) = \varepsilon I + \sum_{k=0}^{K-1} x(k)x^T(k)$.

3) $\Delta W = \eta \left[ \sum_{k=1}^{K} \gamma(k)x^T(k-1) \right] V^{-1}(K)$.

The above-described algorithm and associated process is advantageous because it provides more efficient convergence of the weight matrix W. This convergence is quantified below.

The complexity of the algorithm and associated process is $3N^2K + 2NN_oK + 14N^3/3$ operations (multiplications and additions) for a whole cycle, where $N_o$ is the number of output nodes. The first term $3N^2K$ represents the number of operations in computing the summation in the brackets [ ] in Equation (30) ($2N^2$ operations) and in computing V(K) ($N^2$ operations, by exploiting the matrix symmetry). The second term $2NN_oK$ represents the complexity in computing the $\gamma$'s. The last term represents the multiplication of the term in the brackets [ ] in Equation (30) with $V^{-1}(K)$, which amounts to a solution of a linear system, and can be computed with $14N^3/3$ operations. Since typically N<<K (the number of examples is typically several hundreds or thousands, whereas the number of nodes is typically 10 or 20. The complexity is approximately $3N^2K + 2NN_oK$ operations, or $3N^2 + 2NN_o$ operations per data point. Also, typically $N_o$<<N, and in a majority of applications there is only one output node. In such a case there is about $3N^2$ operations per data point.

As a comparison, the complexity of the fastest known of the existing off-line techniques is about $4N^2$ operations per data point. Thus the new technique is about 25% faster in terms of update direction calculation in case of a small number of outputs, and is always faster if $N_o$<N/2, which is usually true in most applications.

This algorithm represents an off-line version of the proposed method. Although it is a computationally efficient update, it is advantageous to have also an on-line version, whereby the update at data point K can be efficiently computed on the basis of the update at data point K−1. A method to implement that is described below with reference to FIG. 5.

Figure 5:
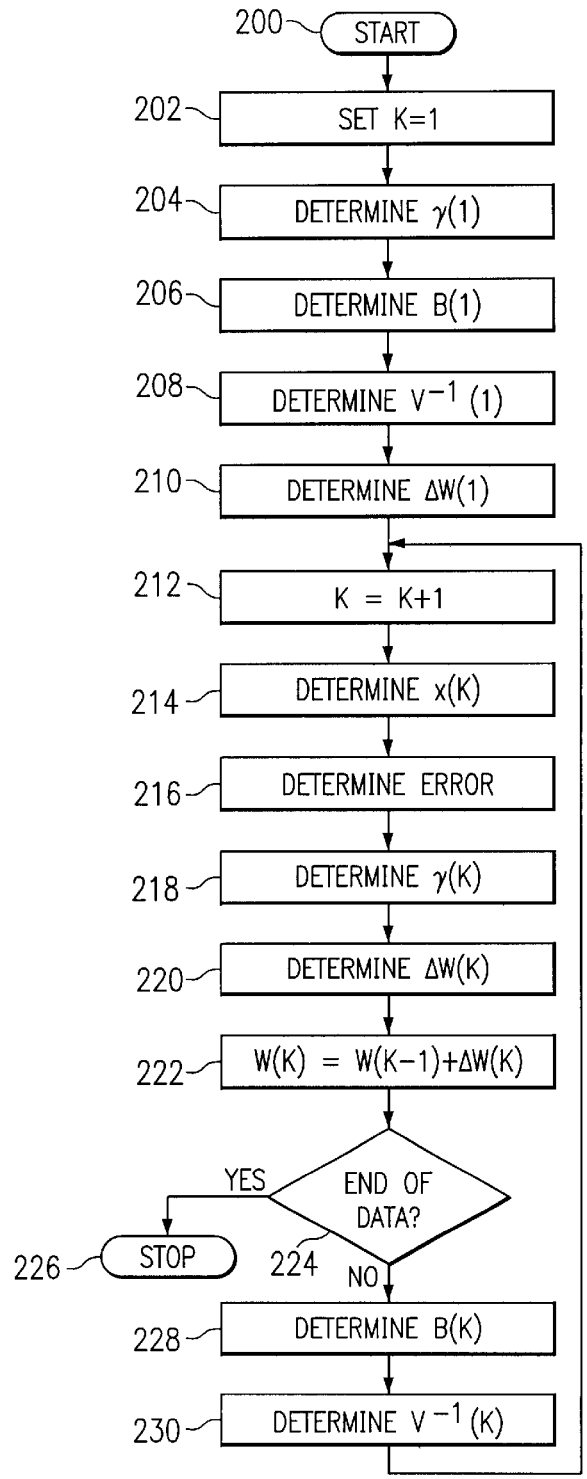
FIG. 5 is a flowchart showing example steps associated with a second embodiment of the recurrent network training logic of FIG. 3 according to the teachings of the invention.

FIG. 5 is a flowchart illustrating example steps associated with recurrent network training logic 22 training a recurrent network according to a second embodiment of the invention. In this embodiment, referred to as an on-line training, the weight matrix is updated in response to the receipt of additional data points. Thus, this approach may be used "on-line" as additional data arrives. These additional data points provide additional information regarding the error, as defined by Equation (3). Alternatively, this "on-line" training algorithm may also be used after all data has arrived. Before describing the process of FIG. 5, the theory and relevant formulas are first described.

Assume that the update based on the data (x(1),d(1)), ..., (x(K−1),d(K−1)) is already available (say=$\Delta W(K-1)$). Now, a new data point d(K) arrives. A corresponding value for x(K) may be predicted. The update $\Delta W(K)$ then becomes:

$$\Delta W(K) = \eta \left[ \sum_{k=1}^{K-1} \gamma(k)x^T(k-1) + \gamma(K)x^T(K-1) \right] [V(K-1) + x(K-1)x^T(K-1)x^T(K-1)]^{-1} \quad (31)$$

Using a small rank adjustment matrix inversion lemma, the inverse of V(K) is obtained recursively in terms of the inverse of V(K−1), as follows:

$$V^{-1}(K) = (V(K-1) + x(K-1)x^T(K-1))^{-1} = \quad (32)$$

$$V^{-1}(K-1) - \frac{[V^{-1}(K-1)x(K-1)][V^{-1}(K-1)x(K-1)]^T}{1 + x^T(K-1)V^{-1}(K-1)x(K-1)}$$

To simplify the final result, an internal matrix is defined as $$B(K) = \sum_{k=1}^{K} \gamma(k)x^T(k-1). \quad (33)$$

Substituting Equation (32) into Equation (33), and after some simplification, an on-line update formula is defined as:

$$\Delta W(K) = \Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)} \quad (34)$$

Such an algorithm may be coded in recurrent network training logic 22 or otherwise implement as described above for the process of FIG. 4. Referring to FIG. 5, example steps associated with a process incorporating such an algorithm are described.

The method begins at step 200. At step 202, the time index k is set to one. At step 204, $\gamma(1)$ is determined according to the equation:

$$\gamma(1) = -D^{-1}(0)e^T \quad (1)$$

At a step 206, the internal matrix B(1) is determined according to the formula:

$$B(1) = \gamma(1)x^T(0).$$

At a step 208, $V^{-1}(1)$ is determined according to the formula:

$$V^{-1}(1) = I/\epsilon - x(0)x^T(0)/[\epsilon^2 + \epsilon x^T(0)x(0)].$$

Based on the results of steps 204, 206, and 208, a change in the weight matrix at time increment K=1 is determined at step 210 according to the formula:

$$\Delta W = \eta B(1)V^{-1}(1).$$

The time index is then incremented at step 212 to K=K+1. At a step 214, x(K), or the predicted value of the data point at time=K is determined according to the formula:

$$x(K) = f[Wx(K-1)]$$

Based on this predicted value of x(K), the error, $e_i(K)$ is determined according to the formula:

$$e_i(K) = \begin{cases} x_i(K) - d_i(K), & i \in O \\ 0, & \text{otherwise,} \end{cases}$$

In the above formula, $e_i$ is explicitly written to emphasize that x is a vector with a plurality of data points and O represents the output nodes. At a step 218, $\gamma(K)$ is determined according to the formula:

$$\gamma(K) = -D^{-1}(K-1)e^T(K) + We^T(K-1).$$

This represents the value of a $\gamma$ at the last time increment.

Based on the value of $\gamma$ at the last time increment and previous values of other internal variables, the change in the weight matrix is updated at step 220 according to the formula:

$$\Delta W(K) = $$
$$\Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}.$$

At step 222, the weight matrix is updated based upon the most current change in the weight matrix determined at step 222. At step 224, a determination is made of whether any additional data points have arrived, corresponding to a next time interval. If not, processing concludes at step 226 and the weight matrix, W, is defined as calculated at step 222.

If there is additional data, processing continues at step 228 in which the value of the matrix B at time increment K is determined according to the formula:

$$B(K) = B(K-1) + \gamma(K)x^T(K-1).$$

At step 230, $V^{-1}(K)$ is determined according to the formula:

$$V^{-1}(K) = (V(K-1) + x(K-1)x^T(K-1))^{-1} =$$
$$V^{-1}(K-1) - \frac{[V^{-1}(K-1)x(K-1)][V^{-1}(K-1)x(K-1)]^T}{1 + x^T(K-1)V^{-1}(K-1)x(K-1)}.$$

These values determined at steps 228 and 230 will be used at step 220 during a next loop to calculate a change in the weight matrix. Processing then continues at step 212 and processing continues until all data are exhausted.

The above-described process may be summarized as follows:

On-Line Training Algorithm:

1) K=1, $\gamma(1)=-D^{-1}(0)e^T(1)$, $B(1)=\gamma(1)x^T(0)$, $V^{-1}(1)=I/\epsilon x(0)x^T(0)/[\epsilon^2+\epsilon-x^T(0)x(0)]$,
1) $\Delta W=\eta B(1)V^{-1}(1)$.
2) K=K+1,
2) $x(K)=f[Wx(K-1)]$, $e_i(k)=x_i(k)-d_i(k)$, if $i \in O$, $e_i(K)=0$), otherwise.
2) $\gamma(K)=-D^{-1}(K-1)e^T(K)+We^T(K-1)$,
2) $\Delta W(K)=\Delta W(K-1)+\eta[(\gamma(K)x^T(K-1)V^{-1}(K-1)-B(K-1)V^{-1}(K-1)x(K-1)[V^{-1}(K-1)x(K-1)]^T)/(1+x^T(K-1)V^{-1}(K-1)x(K-1))]$,
2) $B(K)=B(K-1)+\gamma(K)x^T(K-1)$,
2) $V^{-1}(K)=V^{-1}(K-1)-[([V^{-1}(K-1)x(K-1)][V^{-1}(K-1)x(K-1)]^T)/(1+x^T(K-1)V^{-1}(K-1)x(K-1))]$.
2) Go to 2) till end of data.

The on-line update can also be advantageous in problems that need only off-line training. The reason is that the on-line algorithm permits implementing the so-called sequential update (also called pattern update). Sequential update refers to the fact that the weights are updated after the presentation of each example. For the other type of update, "off-line" or batch update, the weights are updated only after cycling through all examples. It is well known that for the standard backpropagation algorithm the sequential update is generally faster than the batch update, so the on-line algorithm presented in this section provides an advantage in this respect.

Although the present invention and its advantages have been described in detail, it should be understood that various changes, substitutions, and alterations can be made therein without departing from the spirit and scope of the present invention as defined by the appended claims.

What is claimed is:

1. A method for training a recurrent network represented by x(k+1)=f(W x(k)), where W is a weight matrix, x is an input vector, and f is a function, the method comprising:

(a) determining values for an internal variable vector;
(b) determining values for an internal variable matrix;
(c) based on the internal variable vector and the internal variable matrix, determining a change in the weight matrix;
(d) repeating steps (a), (b), and (c) until the change in the weight matrix reaches a specified threshold;

wherein:
the internal variable vector is defined as:

$\gamma(1) = -D^{-1}(0)e^T(1)$; and $\gamma(k) = -D^{-1}(k-1)e^T(k) + We^T(k-1)$ for $k=2, \ldots, K$;

the internal variable matrix is defined as:

$V(K) = \epsilon I + \Sigma_{k=0}^{K-1} x(k)x^T(k)$;

the change in the weight matrix is defined as:

$$\Delta W = \eta \left[ \sum_{k=1}^{K} \gamma(k) x^T(k-1) \right] V^{-1}(K); \text{ and}$$

wherein:

$$D(k) = \text{diag}\left( f'\left( \sum_{j=1}^{N} w_{ij} x_j(k) \right) \right),$$

$$e_i(k) = \begin{cases} x_i(k) - d_i(k), & i \in O \\ 0, & \text{otherwise} \end{cases}$$

$\epsilon = \max(0.5 - \lambda_1, 0)$;

wherein:
I is the identity matrix;
$\eta$ is a real number having a value less than 1.0;
$\lambda_1$ is the smallest eigenvalue of V(K);
f'=the time derivative of f;
$d_i(k)$=measured values of data associated with $x_i$;
i is an index identifying an element of a vector; and
j is an index identifying an element of a vector or a matrix; and
wherein steps (a) through (d) are implemented on a computing device.

2. The method of claim 1, wherein step (c) further comprises calculating an updated value for the weight matrix.

3. The method of claim 1, wherein the recurrent network is a predictive model.

4. The method of claim 1, wherein the recurrent network is a filtering model.

5. The method of claim 1, wherein the recurrent network is a classification or grouping model.

6. A method for training a recurrent network represented by x(k+1)=f(W x(k)), where W is a weight matrix, x is the output of the network, and K is a time index, the method comprising:
(a) determining the weight matrix at a first time increment;
(b) incrementing the time increment associated with a received data point; and
(c) determining a change in the weight matrix at the incremented time interval according to the formula:

$$\Delta W(K) =$$

$$\Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}$$

wherein:
$\eta$ is a real number having a value less than 1.0;

$\gamma(1) = -D^{-1}(0)e^T(1)$;

$\gamma(K) = -D^{-1}(K-1)e^T(K) + We^T(K-1)$;

$B(1) = \gamma(1)x^T(0)$;

$B(K) = B(K-1) + \gamma(K)x^T(K-1)$;

$V^{-1}(1) = I/\epsilon - x(0)x^T(0)/[\epsilon^2 + \epsilon x^T(0)x(0)]$;

$$V^{-1}(K) = V^{-1}(K-1) - \frac{[V^{-1}(K-1)x(K-1)][V^{-1}(K-1)x(K-1)]^T}{1 + x^T(K-1)V^{-1}(K-1)x(K-1)};$$

$$D(k) = \text{diag}\left( f'\left( \sum_{j=1}^{N} w_{ij} x_j(k) \right) \right);$$

$$e_i(K) = \begin{cases} x_i(K) - d_i(K), & i \in O \\ 0, & \text{otherwise,} \end{cases};$$

wherein:
$\epsilon = \max(0.5 - \lambda_1, 0)$;
$\lambda_1$ is the smallest eigenvalue of V(K);
f'=the time derivative of f;
$d_i(K)$=measured values of data associated with $x_i$;
i is an index identifying an element of a vector; and
j is an index identifying an element of a vector or a matrix; and
wherein steps (a) through (d) are implemented on a computing device.

7. The method of claim 6, and further comprising calculating an updated value for the weight matrix.

8. The method of claim 6, wherein the recurrent network is a predictive model.

9. The method of claim 6, wherein the recurrent network is a filtering model.

10. The method of claim 6, wherein the recurrent network is a classification or grouping model.

11. A computerized system for training a recurrent network represented by x(k+1)=f(W x(k)), where W is a weight matrix, x is an input vector, and f is a function, comprising:
a computer readable medium; and
a computer program encoded on the computer-readable medium, the computer program operable to:
(a) determine values for an internal variable vector;
(b) determine values for an internal variable matrix;
(c) based on the internal variable vector and the internal variable matrix, determine a change in the weight matrix;
(d) repeat steps (a), (b), and (c) until the change in the weight matrix reaches a specified threshold;

wherein:

the internal variable vector is defined as:

$\gamma(1) = -D^{-1}(0)e^T(1)$; and $\gamma(k) = -D^{-1}(k-1)e^T(k) + We^T(k-1)$ for $k=2,\ldots,K$;

the internal variable matrix is defined as:

$V(K) = \epsilon I + \Sigma_{k=0}^{K-1} x(k)x^T(k)$;

the change in the weight matrix is defined as:

$$\Delta W = \eta \left[ \sum_{k=1}^{K} \gamma(k) x^T(k-1) \right] V^{-1}(K);\text{ and}$$

wherein:

$$D(k) = \text{diag}\left( f'\left( \sum_{j=1}^{N} w_{ij} x_j(k) \right) \right),$$

$$e_i(k) = \begin{cases} x_i(k) - d_i(k), & i \in \mathcal{O} \\ 0, & \text{otherwise,} \end{cases}$$

$\varepsilon = \max(0.5 - \lambda_1, 0)$; and wherein:
I is the identity matrix;
$\eta$ is a real number having a value less than 1.0;
$\lambda_1$ is the smallest eigenvalue of V(K);
f'=the time derivative of f;
$d_i(k)$=measured values of data associated with $x_i$;
i is an index identifying an element of a vector; and
j is an index identifying an element of a vector or a matrix.

12. The system of claim 11, wherein the recurrent network is a predictive model.

13. The system of claim 11, wherein the recurrent network is a filtering model.

14. The system of claim 11, wherein the recurrent network is a classification or grouping model.

15. The system of claim 11, wherein the computer readable medium is a CD ROM.

16. The system of claim 11, wherein the computer readable medium is a hard disk drive.

17. A computerized system for training a recurrent network represented by $x(k+1) = f(W\,x(k))$, where W is a weight matrix, x is the output of the network, and K is a time index, comprising:

a computer readable medium; and a computer program encoded on the computer-readable medium, the computer program operable to:
determine the weight matrix at a first time increment;
increment the time increment associated with a received data point; and
determine a change in the weight matrix at the incremented time interval according to the formula:

$$W(K) = \Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}$$

wherein:

$\eta$ is a real number having a value less than 1.0;

$\gamma(1) = -D^{-1}(0)e^T(1)$;

$\gamma(K) = -D^{-1}(K-1)e^T(K) + We^T(K-1)$;

$B(1) = \gamma(1)x^T(0)$;

$B(K) = B(K-1) + \gamma(K)x^T(K-1)$;

$V^{-1}(1) = I/\epsilon - x(0)x^T(0)/[\epsilon^2 + \epsilon x^T(0)x(0)]$;

$$V^{-1}(K) = V^{-1}(K-1) - \frac{[V^{-1}(K-1)x(K-1)][V^{-1}(K-1)x(K-1)]^T}{1 + x^T(K-1)V^{-1}(K-1)x(K-1)};$$

$$D(k) = \text{diag}\left( f'\left( \sum_{j=1}^{N} w_{ij} x_j(k) \right) \right);$$

$$e_i(K) = \begin{cases} x_i(K) - d_i(K), & i \in \mathcal{O} \\ 0, & \text{otherwise,} \end{cases}; \text{ and}$$

wherein:
$\epsilon = \max(0.5 - \lambda_1, 0)$;

$\lambda_1$ is the smallest eigenvalue of V(K);
f'=the time derivative of f;
$d_i(K)$=measured values of data associated with $x_i$;
i is an index identifying an element of a vector; and
j is an index identifying an element of a vector or a matrix.

18. The system of claim 17, wherein the recurrent network is a predictive model.

19. The system of claim 17, wherein the recurrent network is a filtering model.

20. The system of claim 17, wherein the recurrent network is a classification or grouping model.

21. The system of claim 17, wherein the computer readable medium is a CD ROM.

22. The system of claim 17, wherein the computer readable medium is a hard disk drive.

23. A computerized method for training a recurrent network represented by $x(k+1) = f(W\,x(k))$, where W is a weight matrix, x is the output of the network, and K is a time index, the method comprising:

(a) determining, by a computer, the weight matrix at a first time increment;

(b) incrementing, by a computer, the time increment in response to a received data point;

(c) determining, by a computer, a change in the weight matrix at the incremented time interval according to the formula:

$$W(K) = \Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}$$

wherein:

$\eta$ is a real number having a value less than 1.0;

$\gamma(1) = -D^{-1}(0)e^T(1)$;

$\gamma(K) = -D^{-1}(K-1)e^T(K) + We^T(K31\ 1)$;

$B(1) = \gamma(1)x^T(0)$;

$B(K) = B(K-1) + \gamma(K)x^T(K-1)$;

$V^{-1}(1) = I/\epsilon - x(0)x^T(0)/[\epsilon^2 + \epsilon x^T(0)x(0)]$;

$$V^{-1}(K) = V^{-1}(K-1) - \frac{[V^{-1}(K-1)x(K-1)][V^{-1}(K-1)x(K-1)]^T}{1 + x^T(K-1)V^{-1}(K-1)x(K-1)};$$

$$D(k) = \text{diag}\left(f'\left(\sum_{j=1}^{N} w_{ij}x_j(k)\right)\right);$$

$$e_i(K) = \begin{cases} x_i(K) - d_i(K), & i \in 0 \\ 0, & \text{otherwise}, \end{cases}; \text{ and}$$

wherein:
$\epsilon = \max(0.5 - \lambda_1, 0)$;
$\lambda_1$ is the smallest eigenvalue of V(K);
f'=the time derivative of f;
$d_i$(K)=measured values of data associated with $x_i$;
i is an index identifying an element of a vector; and
j is an index identifying an element of a vector or a matrix; and (d) calculating an updated value for the weight matrix.

24. The method of claim 23, wherein step (c) further comprises calculating an updated value for the weight matrix.

25. The method of claim 23, wherein the recurrent network is a predictive model.

26. The method of claim 23, wherein the recurrent network is a filtering model.

27. The method of claim 23, wherein the recurrent network is a classification or grouping model.

28. A method for use in updating a weight matrix, W, used to describe a recurrent network represented by x(k+1)=f(W x(k)), where x is the output of the network, and K is a time index, wherein a change, ΔW, in the weight matrix is determined based on an internal variable matrix V(K), the method comprising:

determining, by a computing device, V(K) according to the formula $$V(K) = \varepsilon I + \sum_{k=0}^{K-1} x(k)x^T(k); \text{ and}$$

recursively solving for ΔW by the computing device;
wherein $\epsilon = \max(0.5 - \lambda_1, 0)$; and
wherein $\lambda_i$ is the smallest eigenvalue of V(K).

29. A system for training a recurrent network represented by x(k+1)=f(W x(k)), where W is a weight matrix, x is an input vector, and f is a function, the system comprising:

a processor;
a computer readable medium associated with the processor; and
logic encoded on the computer readable medium, the logic operable, when executed on the processor, to:
(a) determine values for an internal variable vector;
(b) determine values for an internal variable matrix;
(c) based on the internal variable vector and the internal variable matrix, determine a change in the weight matrix;
(d) repeat steps (a), (b), and (c) until the change in the weight matrix reaches a specified threshold;

wherein:
the internal variable vector is defined as:

$\gamma(1) = -D^{-1}(0)e^T(1)$; and $\gamma(k) = -D^{-1}(k-1)e^T(k) + We^T(k-1)$ for k=2, . . .,K;

the internal variable matrix is defined as:

$V(K) = \epsilon I + \Sigma_{k=0}^{K-1} x(k)x^T(k)$;

the change in the weight matrix is defined as:

$$\Delta W = \eta \left[\sum_{k=1}^{K} \gamma(k)x^T(k-1)\right]V^{-1}(K); \text{ and}$$

wherein:

$$D(k) = \text{diag}\left(f'\left(\sum_{j=1}^{N} w_{ij}x_j(k)\right)\right),$$

$$e_i(k) = \begin{cases} x_i(k) - d_i(k), & i \in 0 \\ 0, & \text{otherwise}, \end{cases}$$

$\varepsilon = \max(0.5 - \lambda_1, 0)$; and wherein:
I is the identity matrix;
$\eta$ is a real number having a value less than 1.0;
$\lambda_1$ is the smallest eigenvalue of V(K);
f'=the time derivative of f;
$d_i$(k)=measured values of data associated with $x_i$;
i is an index identifying an element of a vector; and
j is an index identifying an element of a vector or a matrix.

30. A system for training a recurrent network represented by x(k+1)=f(W x(k)), where W is a weight matrix, x is the output of the network, and K is a time index, the system comprising:

a processor;
a computer readable medium associated with the processor; and
logic encoded on the computer readable medium, the logic operable, when executed on the processor, to:
determine the weight matrix at a first time increment;
increment the time increment associated with a received data point; and
determine a change in the weight matrix at the incremented time interval according to the formula:

$$\Delta W(K) = \Delta W(K-1) + \eta \frac{\gamma(K)x^T(K-1)V^{-1}(K-1) - B(K-1)V^{-1}(K-1)x(K-1)[V^{-1}(K-1)x(K-1)]^T}{1 + x^T(K-1)V^{-1}(K-1)x(K-1)}$$

wherein:

$\eta$ is a real number having a value less than 1.0;

$\gamma(1) = -D^{-1}(0)e^T(1)$;

$\gamma(K) = -D^{-1}(K-1)e^T(K) + We^T(K-1)$;

$B(1) = \gamma(1)x^T(0)$;

$B(K) = B(K-1) + \gamma(K)x^T(K-1)$;

$V^{-1}(1) = I/\epsilon - x(0)/[\epsilon^2 + \epsilon x^T(0)x(0)]$;

$$V^{-1}(K) = V^{-1}(K-1) - \frac{[V^{-1}(K-1)x(K-1)][V^{-1}(K-1)x(K-1)]^T}{1 + x^T(K-1)V^{-1}(K-1)x(K-1)};$$

$$D(k) = \operatorname{diag}\left(f'\left(\sum_{j=1}^{N} w_{ij}x_j(k)\right)\right);$$

$$e_i(K) = \begin{cases} x_i(K) - d_i(K), & i \in 0 \\ 0, & \text{otherwise,} \end{cases} \text{; and}$$

wherein:

$\epsilon = \max(0.5 - \lambda_1, 0)$;

$\lambda_1$ is the smallest eigenvalue of $V(K)$;

f'=the time derivative of f;

$d_i(K)$=measured values of data associated with $x_i$;

i is an index identifying an element of a vector; and j is an index identifying an element of a vector or a matrix.

31. A method for training a recurrent network represented by x(k+1)=f (W x(k)), where W is a weight matrix, x is an input vector, and f is a function, the method comprising:

(a) determining values for an internal variable vector;

(b) determining values for an internal variable matrix;

(c) based on the internal variable vector and the internal variable matrix, determining a change in the weight matrix;

(d) repeating steps (a), (b), and (c) until the change in the weight matrix reaches a specified threshold;

wherein the internal variable matrix is defined as the sum of $\epsilon I$ and another matrix that is a function of x(k); and wherein $\epsilon = \max(0.5 - \lambda_1, 0)$;

wherein $\lambda_i$ is the smallest eigenvalue of the internal voice vector; and wherein steps (a) through (d) are implemented on a computing device.

32. The method of claim 31, wherein step (c) further comprises calculating an updated value for the weight matrix.

33. The method of claim 31, wherein the recurrent network is a predictive model.

34. The method of claim 31, wherein the recurrent network is a filtering model.

35. The method of claim 31, wherein the recurrent network is a classification or grouping model.

36. A method for training a recurrent network represented by x(k+1)=f(W x(k)), where W is a weight matrix, x is an input vector, and f is a function, the method comprising:

(a) determining, in substantially real time, values for an internal variable vector;

(b) determining, in substantially real time, values for an internal variable matrix;

(c) based on the internal variable vector and the internal variable matrix, determining, in substantially real time, a change in the weight matrix;

wherein the change in the weight matrix is a function of an internal variable matrix vector and wherein the internet variable matrix is defined as the sum of $\epsilon I$ and another matrix that is a function of x(K); and wherein $\epsilon = \max(0.5 - \lambda_1, 0)$;

wherein $\lambda_1$ is the smallest eigenvalue of the internal voice vector; and wherein steps (a) through (c) are implemented on a computing device.

37. The method of claim 36, and further comprising calculated and updated value for the weight matrix.

38. The method of claim 36, wherein the recurrent network is a predictive model.

39. The method of claim 36, wherein the recurrent network is a filtering model.

40. The method of claim 36, wherein the recurrent network is a classification or grouping model.

* * * * *